United States Patent [19]

Spinelli et al.

[11] 4,330,458

[45] May 18, 1982

[54] HIGH SOLIDS COATING COMPOSITION OF A BLEND OF A LOW MOLECULAR WEIGHT ACRYLIC POLYMER AND A MEDIUM MOLECULAR WEIGHT ACRYLIC POLYMER AND AN ALKYLATED MELAMINE CROSS-LINKING AGENT

[75] Inventors: Harry J. Spinelli, Newark, Del.; Alan L. Thompson, Rochester, Mich.

[73] Assignee: E. I. Du Pont de Nemours and Company, Wilmington, Del.

[21] Appl. No.: 144,297

[22] Filed: Apr. 28, 1980

[51] Int. Cl.$^3$ .................. C08L 33/14; C08L 61/28
[52] U.S. Cl. .................. 524/512; 525/108; 525/162; 523/437
[58] Field of Search ............ 525/162, 163; 260/33.4 R, 32.8 R, 31.4 R, 31.6, 39 R, 45.7 PH

[56] References Cited

U.S. PATENT DOCUMENTS

| | | | |
|---|---|---|---|
| 2,681,897 | 6/1954 | Frazier et al. | 260/45.2 |
| 2,878,237 | 3/1959 | Russell et al. | 260/80 |
| 3,267,174 | 8/1966 | Fry et al. | 260/848 |
| 3,352,806 | 11/1967 | Hicks | 260/29.4 |
| 3,540,917 | 11/1970 | Seifer | 117/76 |
| 3,622,651 | 11/1971 | Vasta | 260/856 |
| 3,637,546 | 1/1972 | Parker | 260/15 |
| 3,674,734 | 7/1972 | Parker | 260/31.2 N |
| 3,773,710 | 11/1973 | Victorius | 525/155 |
| 3,841,895 | 10/1974 | Hick | 117/72 |
| 3,846,368 | 11/1974 | Pettit, Jr. | 525/155 |
| 3,901,840 | 8/1975 | Irvin et al. | 525/162 |
| 4,102,943 | 7/1978 | Isaksen et al. | 260/850 |
| 4,221,683 | 9/1980 | Nakate et al. | 525/162 |
| 4,276,212 | 6/1981 | Khanna et al. | 260/39 R |

FOREIGN PATENT DOCUMENTS

856347  11/1970  Canada .

OTHER PUBLICATIONS

Modern Paint and Coatings, "Acrylic Resins: Familiar Technology, Effective Coatings", 3/75, pp. 23-28.
Industrial Finishings, "High Solids Acrylic Coatings", 5/75, pp. 25-27.
Encyclopedia of Chemical Technology, Kirkothmer, Interscience, 1963, vol. 1, p. 305.
Rohm and Haas Co. Bulletin, C398, Apr. 1975, "Acryloid OL-42 Acrylic Oligomer For High Solids Coatings".

*Primary Examiner*—Theodore E. Pertilla
*Attorney, Agent, or Firm*—Hilmar L. Fricke

[57] ABSTRACT

The high solids coating composition contains at least 50% by weight of a binder of film-forming constituents in which the constituents are of
  (A) a medium molecular weight acrylic polymer that has a number average molecular weight of about 5,000–20,000, a hydroxyl content of at least 2% by weight, a glass transition temperature of about −20° C. to +25° C., and is of an alkyl methacrylate, a hydroxy alkyl acrylate or a hydroxy alkyl methacrylate, and optionally, an alkyl acrylate or styrene;
  (B) a low molecular weight acrylic polymer that has a number average molecular weight of about 500–7,500 a hydroxyl content of at least 2% by weight, a glass transition temperature of about −20° C. to +25° C., and is of an alkyl methacrylate, a hydroxy alkyl acrylate or a hydroxy alkyl methacrylate, and optionally, an alkyl acrylate and styrene;
  (C) an alkylated melamine formaldehyde cross-linking agent; and an acid catalyst;

the composition is particularly useful as an exterior finish for automobiles, trucks, airplanes and can be used as an appliance finish and for coil coatings.

13 Claims, No Drawings

HIGH SOLIDS COATING COMPOSITION OF A BLEND OF A LOW MOLECULAR WEIGHT ACRYLIC POLYMER AND A MEDIUM MOLECULAR WEIGHT ACRYLIC POLYMER AND AN ALKYLATED MELAMINE CROSS-LINKING AGENT

BACKGROUND OF THE INVENTION

This invention is related to high solids coating compositions, in particular, to high solids acrylic coating compositions.

Conventional coating compositions of a high molecular weight acrylic polymer and melamine crosslinking resins are well known in the art as shown by Vasta U.S. Pat. No. 3,622,651, issued Nov. 23, 1971; Hick U.S. Pat. No. 3,841,895, issued Oct. 15, 1974; Parker U.S. Pat. No. 3,674,734, issued July 4, 1972 and Parker U.S. Pat. No. 3,637,546, issued Jan. 25, 1972. These patents illustrate high quality coating compositions. However, these compositions have a relatively high solvent content to provide for good application properties and good properties of the resulting dried finish. To utilize these compositions in areas which have strict air pollution regulations, pollution abatement equipment is required. This equipment is expensive and increases capital investment of a plant and is costly to operate. Any attempt to reduce the solvent content of these conventional compositions generally results in finishes which have either a poor appearance or unacceptable properties or both.

In an effort to obtain high solids coating compositions that can be applied by conventional spraying techniques, the molecular weight of the acrylic polymer used in these compositions was reduced substantially and solvent content of the coating compositions was reduced. The reduction in molecular weight caused a problem of poor appearance, particularly two tone metallic glamour, of finishes of these compositions when aluminum flake pigments were used therein. The poor appearance is caused by improper orientation of the aluminum flake in the finish.

There is a great need for a coating composition that has a low solvent content and that will meet current air pollution regulations but still provides a high quality finish with good two tone metallic glamour that is useful as an exterior finish for automobiles, trucks and airplanes. The high solids coating composition of this invention has these desirable characteristics.

SUMMARY OF THE INVENTION

The high solids coating composition comprises at least 50% by weight of a binder of film-forming constituents and up to 50% by weight of a non-aqueous liquid carrier; in which the film-forming constituents consist essentially of (A) about 5–45% by weight of a medium molecular weight acrylic polymer having a number average molecular weight, determined by gel permeation chromotography, of about 5,000–20,000, a hydroxyl content of about 2%–10% by weight, a glass transition temperature of about −20° C. to +25° C. and consists essentially of
an alkyl methacrylate that has 1-18 carbon atoms in the alkyl group, a hydroxy alkyl acrylate, or a hydroxy alkyl methacrylate each having 2–4 carbon atoms in the alkyl group, and optionally, an alkyl acrylate that has 2-18 carbons in the alkyl group or styrene and (B) about 10–50% by weight of a low molecular weight acrylic polymer having a number average molecular weight determined as above of about 500–7,500, a hydroxyl content of about 2%–10% by weight, a glass transition temperature of about −20° C. to +25° C. and consists essentially of
an alkyl methacrylate that has 1-18 carbon atoms in the alkyl group, a hydroxy alkyl acrylate, or a hydroxy alkyl methacrylate each having 2–4 carbon atoms in the alkyl group, and optionally, an alkyl acrylate that has 2-18 carbons in the alkyl group or styrene;
wherein the difference in molecular weight between the acrylic polymers is at least 3000; and (C) 25–45% by weight of alkylated melamine formaldehyde cross-linking agent having 1-4 carbon atoms in the alkyl group; and in addition to the above film-forming constituents contains about 0.1-2.0% by weight of an acid catalyst.

DESCRIPTION OF THE INVENTION

The high solids coating composition has a binder content of film-forming constituents of at least 50% by weight. Generally, the composition has a binder content of about 60-85%. The remainder of the composition is a liquid carrier which generally is solvent for the binder. In addition, the composition optionally contains about 0.1-30% by weight, based on the weight of the coating composition, of pigment.

The binder or film-forming constituents used in the coating composition comprise about 5–45% by weight of a medium molecular weight acrylic polymer, about 10–50% by weight of a low molecular weight acrylic polymer and about 25–45% by weight of an alkylated melamine formaldehyde cross-linking agent.

The acrylic polymers utilized in the coating composition are prepared by solution polymerization in which the monomers are blended with solvent, polymerization catalyst and optionally, a chain transfer agent, and heated to about 75°–150° C. for 1-6 hours to form a polymer that has a number average molecular weight of about 500–20,000, a hydroxyl content of 2-10% by weight and a glass transition temperature of about −20° C. to +25° C.

To form films that have acceptable physical properties from these low and medium molecular weight acrylic polymers, the polymers must have a hydroxyl content that is about two or three times higher than acrylic polymers used for conventional thermosetting compositions. The higher hydroxyl content provides additional crosslinking sites and films are formed that have excellent physical properties that are equivalent to and often better than films formed from conventional thermosetting acrylic compositions.

The number average molecular weight of the acrylic polymers is determined by gel permeation chromatography using polymethylmethacrylate as a standard.

The glass transition temperature of the polymers is determined by differential scanning colorimetry or is calculated.

One technique that is successfully used in preparing the acrylic polymers is a programmed addition of monomers, solvent, catalyst solution and optionally, a chain transfer agent into a polymerization vessel at a given rate. These programmed additions can be manually calculated or calculated by a computer. This allows for the polymerization of the low and medium molecular weight acrylic polymers. Optionally, the polymers can be terminated with the chain transfer agent at the desired low molecular weight. Also, if required, after the polymerization is completed, solvents can be stripped off to increase the polymer solids content of the resulting polymer solution.

Typical solvents which are used to prepare the acrylic polymers are the following: toluene, ethyl acetate, acetone, methyl isobutyl ketone, methylethyl ketone, ethyl alcohol, mineral spirits, ethylene glycol monoethyl ether acetate, and other aliphatic, cycloaliphatic and aromatic hydrocarbon, esters, ethers, ketones and alcohols which are conveniently used.

About 0.1–4% by weight, based on the weight of the monomers, of the polymerization catalyst is used to prepare the acrylic polymer. Typical catalysts are: azobis-isobutyronitrile, azo-bis(gamma dimethyl valeronitrile), benzoyl peroxide, t-butyl pivalate and the like.

A chain transfer agent can be used to control the molecular weight of the acrylic polymers. Typical chain transfer agents are 2-mercapto ethanol, dodecyl mercaptan, benzene thioethanol, mercapto succinic acid, butyl mercaptan, lauryl mercaptan, mercapto propionic acid and the like. When a transfer agent is used, the resulting acrylic polymer contains about 0.5–10% by weight of a chain transfer agent.

The acrylic polymers used in the high solids coating composition are of an alkyl methacrylate that has 1–8 carbon atoms in the alkyl group, and an alkyl acrylate that has 2–18 carbon atoms in the alkyl group and a hydroxy alkyl acrylate or a hydroxy alkyl methacrylate each having 2–4 carbon atoms in the alkyl group. To form an acrylic polymer which has a hydroxyl content of about 2–10% by weight, a sufficient amount of the aforementioned hydroxy alkyl acrylate or methacrylate is utilized. The polymer also can contain small amounts of $\alpha,\beta$-ethylenically unsaturated carboxylic acid, such as acrylic acid, methacrylate acid, itaconic acid, in amounts of about 0.1–5% by weight.

Typical alkyl methacrylates and acrylates that can be used to prepare the acrylic polymers are: methyl methacrylate, ethyl methacrylate, butyl methacrylate, hexyl methacrylate, 2-ethylhexyl methacrylate, nonyl methacrylate, lauryl methacrylate, stearyl methacrylate, cyclohexyl methacrylate, isodecyl methacrylate, propyl methacrylate, phenyl methacrylate, isobornyl methacrylate, ethyl acrylate, propyl acrylate, isopropyl acrylate, butyl acrylate, isobutyl acrylate, hexyl acrylate, 2-ethylhexyl acrylate, nonyl acrylate, lauryl acrylate, stearyl acrylate, cyclohexyl acrylate, isodecyl acrylate, phenyl acrylate, isobornyl acrylate and the like.

Adhesion promoting monomers can also be used in the acrylic polymers such as diethyl aminoethyl methacrylate, tertiary butyl aminoethyl methacrylate, 3-(2-methacryloxy ethyl)-2,2-spiro cyclohexyl oxazolidene and the like.

Typical hydroxy alkyl acrylates and methacrylates which can be used to prepare the acrylic polymers are: 2-hydroxy ethyl acrylate, 2-hydroxy propyl acrylate, 2-hydroxy butyl acrylate, 2-hydroxy ethyl methacrylate, 2-hydroxy propyl methacrylate, 2-hydroxy butyl methacrylate, and the like.

The acrylic polymers can contain about 0.1–30% by weight of other constituents such as acrylonitrile, methacylonitrile, acrylamide and methacrylamide, styrene or substituted styrene such as methyl styrene.

Useful acrylic polymers contain about 15–82% by weight of an alkyl methacrylate that has 1–4 carbon atoms in the alkyl group, preferably methyl methacrylate, 2–50% by weight of an alkyl acrylate that has 2–12 carbon atoms in the alkyl group and 16–35% by weight of a hydroxyl alkyl acrylate or a hydroxyl alkyl methacrylate each having 2–4 carbon atoms in the alkyl group. These polymers can contain up to 30% by weight of styrene which replaces a portion of the alkyl methacrylate. Also these polymers can contain an $\alpha$-$\beta$ ethylenically unsaturated carboxylic acid.

Particularly useful acrylic polymers comprises about 10–20% by weight styrene, 10–20% by weight methyl methyacrylate, 35–48% by weight butyl acrylate, 20–30% by weight hydroxyl ethyl acrylate and 0.1–5% by weight of acrylic acid and have a number average molecular weight of 1,500–10,000. Preferred acrylic polymers of the above type contains about 16% styrene, 15.8% methyl methacrylate, 43% butyl acrylate, 25% hydroxy ethyl acrylate and 0.2% acrylic acid. Another useful acrylic polymer contains about 29% styrene, 21% methyl methacrylate, 32% butyl acrylate, 17% hydroxy ethyl acrylate and 1% acrylic acid.

Preferred medium molecular weight acrylic polymers have a number average molecular weight of about 5,000–10,000 and low molecular weight acrylic polymers have a number average molecular weight of about 1,500 to 4,000.

Optionally, in addition to the above film-forming constituents, about 1–10% by weight, based on the weight of the film-forming constituents of the composition, of cellulose acetate butyrate can be used in the composition. Cellulose acetate butyrate that has a butyl content of about 25–60% by weight and a viscosity of about 0.01–2 seconds measured according to ASTM-D-1343-56 at 25° C. can be utilized.

Also, in addition to the above film-forming constituents, plasticizers in the amounts of 0.1–10% by weight, based on the weight of the film-forming constituents, can be used in the composition. Plasticizers that can be used are, for example, butyl benzyl phthalate, dibutyl phthalate, triphenyl phosphate, 2-ethylhexyl benzyl phthalate, dicyclohexyl phthalate, diallyl phthalate, dibenzyl phthalate, butylcyclohexyl phthalate, mixed benzoic acid and fatty oil acid esters of pentaerythritrol, poly-(propylene adipate)dibenzoate, diethylene glycol dibenzoate, tetrabutylthiodisuccinate, butylphthalylbutyl glycolate, acetyltributyl citrate, dibenzylsebacate, tricresyl phosphate, toluene ethyl sulfonamide, and dimethylene cyclohexyl phthalate.

The composition can contain in addition from about 0.5–15% by weight, based on the weight of the composition, of a polyhydroxy functional compound. This compound is a solvent for the film-forming constituents and reduces the application viscosity of the composition and will be cross-linked into a resulting finish prepared from the composition. Typical polyhydroxy functional compounds that are useful are trimethylol ethane, trimethylol propane, trimethylol butane, trimethyl pentanediol, pentaerythritol, pentanediol, diethylene glycol, dipropylene glycol, triethylene glycol, 2-ethyl-1,3-hexane diol, triproylene glycol, butanediol and the like. Low molecular weight hydroxyl terminated polyesters can be used such as a polyester of trimethyl pentanediol and isophthalic acid, a polyester of trimethyl pentanediol and a mixture of dimethyl aliphatic carboxylates.

The alkylated melamine formaldehyde resin used in the composition generally has 1–4 carbon atoms in the alkyl group. The resin is prepared by conventional techniques in which an alcohol such as methanol, ethanol, propanol, isopropanol, butanol, isobutanol, tertiary butanol and the like is reacted with a melamine formaldehyde resin. The resin can be monomeric or polymeric. One preferred resin which gives a high quality finish is hexamethoxymethyl melamine. One typical resin of the preferred type is "Cymel" 303. Another useful resin is a methoxy-butoxymethyl melamine.

As mentioned before, the composition can contain pigments. These pigments can be introduced into the composition by first forming a mill base with the acrylic polymer utilized in the composition or with other compatible polymers or polymeric dispersants by conventional techniques, such as sand-grinding, ball milling, attritor grinding, two roll milling to disperse the pigments. The mill base is blended with the film-forming constituents as shown in the following Examples.

Any of the conventional pigments used in the coating compositions can be utilized in this composition such as the following: metallic oxides, such as titanium dioxide, zinc oxide, iron oxide and the like, metal hydroxide, metal flakes such as aluminum flake, chromates, such as lead chromate, sulfides, sulfates, carbonates, carbon black, silica, talc, china clay, phthalocyanine blues and greens, organo reds, organo maroons and other organic dyes.

In coating compositions that use aluminum flake, the aluminum flake is blended with a medium or low molecular weight acrylic polymer and the resulting mill base is blended into the coating composition. In the coating composition the medium molecular weight acrylic polymer provides needed rheology control to allow the aluminum flake to orient properly on baking of the finish to provide an acceptable two tone metallic glamour of the resulting finish.

An acid catalyst solution can be added to the composition to increase the rate of cross-linking of the composition on curing. Generally, about 0.1–2% by weight, based on the weight of the film-forming constituents, of acid catalyst is used. For example, phosphoric acid or an alkyl acid phosphate in which the alkyl groups has 1–12 carbon atoms can be utilized for this purpose. Typical alkyl acid phosphates are methyl acid phosphate, ethyl acid phosphate, propyl acid phosphate, lauryl acid phosphate, and the like. Sulfonic acid or a substituted sulfonic acid can be used such as para-toluene sulfonic acid.

Adducts of the aforementioned acids also can be used as catalysts. For example, epoxy resins reacted with phosphoric acid or an alkyl acid phosphate or with a substituted sulfonic acid such as paratoluene sulfonic acid are useful. Typical epoxy resins that can be used to form these adducts are "Epon" 828, 1002, 1003, 1004 which are the condensation products of epichlorohydrin and bisphenol A. Other compounds can be used to form adducts of these acids such as alkyl oxazolidine, e.g., dimethyl oxazolidine.

To improve weatherability of finishes of the coating composition, about 0.1–20%, by weight, based on the weight of the binder, of an ultraviolet light stabilizer or a combination of ultraviolet light stabilizers can be added. Also, about 0.1–5% by weight, based on the weight of the binder, of an antioxidant can be added. Weatherability of finishes of coating compositions containing aluminum flake are particularly enhanced by the addition of ultraviolet light stabilizers and antioxidants. Also, about 0.1–10% by weight, based on the binder, of iron pyrophosphate can be added with ultraviolet light stabilizers and antioxidants to improve weatherability of finishes. Typically useful ultraviolet light stabilizers and antioxidants are disclosed hereinafter.

The coating composition of this invention can be applied over a variety of substrates, such as metal, wood, glass, plastics, and the like, by any of the conventional application methods, such as spraying, electrostatic spraying, dipping, brushing, flow-coating and the like. The viscosity of the composition can be adjusted for any of these methods by adding solvents if necessary. Generally, the composition is utilized at a high solids content which keeps air pollution at a minimum level.

The coatings are baked at relatively low temperatures of about 65°–140° C. for about 15 minutes, 2 hours. The resulting coating is about 0.1–5 mils thick but for most uses, a 1–3 mil thick coating is used. One technique that is used to insure that there will be no popping or cratering of the coating is to allow the solvents to flash off for about 15–30 seconds before a second coating is sprayed on or otherwise applied, then waiting from about 2–10 minutes before baking the coating to allow any residual solvents to flash off. The resulting coating has good gloss and can be rubbed or polished with conventional techniques to improve the smoothness, appearance and gloss. The coating has good adhesion to substrates of all types, is hard and resistant to weathering, solvents, alkali, scratches and the like. These characteristics make the composition particularly useful as a finish for automobiles, trucks, airplanes, railroad equipment and for the repair of trucks and automobiles. The composition can also be used on appliances, vending machines, outdoor equipment such as bridges, water tanks, gas tanks and the like.

One particular use for the composition is that it can be used to repair powder coating finishes, in particular, powder coating finishes which are pigmented with metallic flake pigments, such as aluminum flake pigments. Excellent matches between the finish of the powder coating and the finish of the novel composition are achieved.

Another aspect of this invention is to utilize the composition as a clear coat/color coat finish for substrates. In this finish, a clear coat top layer is in firm adherence to a color coat layer that is in adherence with a substrate. The clear coat is a transparent film of the coating composition of this invention and the color coat is the coating composition of this invention containing pigments in a pigment to binder ratio of about 1/100 to 150/100 and other additives.

Optionally, the color coat can contain about 0.1–20% by weight, based on the weight of the binder of the color coat, of an ultraviolet light stabilizer. Another option is that the color coat and the clear coat each can contain about 0.1–20% by weight, based on the weight of the binder of the coat, of an ultraviolet light stabilizer. Also, the clear coat or the color coat can contain about 0.1–5% by weight, based on the weight of the binder of the coat, of an antioxidant. When an antioxidant is used, the ratio of ultraviolet light stabilizer to antioxidant is about 1:1 to about 50:1.

Preferred, to form a durable finish, both the clear coat and the color coat contain about 5–8% by weight of an ultraviolet light stabilizer and optionally, about 0.1–1% by weight of the antioxidant and the ratio of ultraviolet light stabilizer to antioxidant is about 10:1.

Iron pyrophosphate can be added to either the clear coat or color coat or both in the aforementioned amounts to enhance weatherability of the clear coat/color coat finish.

The thickness of the fully cured color coat and clear coat can vary. Generally, the color coat is about 0.4–1.5 mils thick and preferably 0.6–1.0 mils thick and the clear coat is about 0.5–6.0 mils thick and preferably 0.8–1.5 mils thick. Any of the aforementioned conventional pigments can be used in the color coat including metallic flake pigments can be used. The clear coat can also contain transparent pigments, i.e., pigments having the same or similar refractive index as the binder of the clear coat and are of a small particle size of about 0.015–50 microns. Typical pigments that can be used in a pigment to binder weight ratio of about 1/100 to 10/100 are inorganic siliceous pigments, such as silica pigments. These pigments have a refractive index of about 1.4–1.6.

Typical ultraviolet light stabilizers that are useful are as follows:

Benzophenones such as hydroxy dodecyloxy benzophenone, 2,4-dihydroxybenzophenone, hydroxybenzophenones containing sulfonic groups and the like.

Triazoles such as 2-phenyl-4-(2',4'-dihydroxylbenxoyl)-triazoles, substituted benzotriazoles such as hydroxy-phenyltriazoles and the like.

Triazines such as 3,5-dialkyl-4-hydroxyphenyl derivatives of triazine, sulfur containing derivatives of diallyl-4-hydroxy phenyl triazines, hydroxy phenyl-1,3,5-triazine and the like.

Benzoates such as dibenzoate of diphenylol propane, tertiary butyl benzoate of diphenylol propane, and the like.

Other ultraviolet light stabilizers that can be used include lower alkyl thiomethylene containing phenols, substituted benzenes such as 1,3-bis-(2'-hydroxybenzoyl) benzene, metal derivatives of 3,5-di-t-butyl-4-hydroxy phenyl propionic acid, asymmetrical oxalic acid diarylamides, alkylhydroxy-phenyl-thioalkanoic acid ester and the like.

Particularly useful ultraviolet light stabilizers that can be used are hindered amines of bipiperidyl derivatives such as those in Murayama et al., U.S. Pat. No. 4,061,616, issued Dec. 6, 1977.

Typical antioxidants that are useful are as follows: tetrakis alkylene (di-alkyl hydroxy aryl)alkyl ester alkanes such as tetrakis methylene 3(3',5'-dibutyl-4'hydroxyphenyl)propionate methane, reaction product of p-amino diphenylamine and glycidyl methacrylate, reaction product of n-hexyl-N'-phenyl-p-phenylene diamine and glycidyl methacrylate, pentaerythritol tetrakis(thioglycolate), trimethylol propane tris(thioglycolate), trimethylol ethane tris(thioglycoate), N-(4-anilino phenyl) acrylamide and the like.

One preferred combination of ultraviolet light stabilizer and antioxidant is 2-hydroxy-4-dodecyloxy benzophenone or a substituted 2(2-hydroxyphenyl) benzotriazole and tetrakis methylene 3(3',5'-dibutyl-4'hydroxyphenyl) propionate methane.

The clear coat/color coat finish is applied by conventional spraying techniques and preferably the clear coat is applied to the color coat while the color coat is still wet. Other conventional application techniques can be used such as brushing, roller coating, electrostatic spraying and the like. The finish is then dried at ambient temperatures or can be used as indicated above.

The following examples illustrate the invention. All parts and percentages are on a weight basis unless otherwise indicated. The number average molecular weight (Mn) is determined by gel permeation chromatography using polymethyl methacrylate as a standard.

EXAMPLE 1

A low molecular weight acrylic polymer solution is prepared by charging the following constituents into a polymerization vessel equipped with a thermometer, stirrer, reflux condenser, additional funnel, and a heating mantle:

|  | Parts by Weight |
|---|---|
| Portion 1 | |
| Styrene monomer | 14.38 |
| Methyl methacrylate monomer | 32.98 |
| n-Butyl acrylate monomer | 147.37 |
| Hydroxy ethyl acrylate monomer | 66.67 |
| Acrylic acid monomer | 0.35 |
| Methyl ethyl ketone | 222.49 |
| 2-Mercapto ethanol | 7.09 |
| Portion 2 | |
| Styrene monomer | 90.18 |
| Methyl methacrylate monomer | 70.18 |
| n-Butyl acrylate monomer | 117.54 |
| Hydroxy ethyl acrylate monomer | 156.14 |
| Acrylic acid monomer | 1.05 |
| Portion 3 | |
| Methyl ethyl ketone | 107.82 |
| Azobisisobutyronitrile | 11.93 |
| Portion 4 | |
| Methyl ethyl ketone | 10.00 |
| Portion 5 | |
| 2-Mercapto ethanol | 26.63 |
| Portion 6 | |
| Methyl ethyl ketone | 5.00 |
| Portion 7 | |
| 2-Mercapto ethanol | 0.20 |
| Total | 1088.00 |

Portion 1 is charged into the polymerization vessel and heated to its reflux temperature. The constituents are under constant agitation in the polymerization vessel during the entire process. Portion 2 is premixed and added at a rate of about 3.6 parts/minute over a 120 minute period while the resulting reaction mixture is held at its reflux temperature. Portion 3 is premixed and added simultaneously with Portion 2 at a rate of about 0.83 parts/minute over a 120 minute period. Portion 5 is added simultaneously with Portions 2 and 3 at the rate of about 0.22 parts per minute for 60 minutes and then at a rate of about 0.15 parts/minute for 90 minutes. After all of Portion 3 is added, Portion 4 is added and after all of Portion 5 is added Portion 6 is added and the reaction mixture is held at its reflux temperature for an additional 90 minutes. Portion 7 is added and about 188 parts of methyl ethyl ketone are stripped off. The resulting polymer solution is cooled to 50° C. and then filtered.

The polymer solution has a polymer solid content of about 75% and the polymer is of styrene, methyl methacrylate, n-butyl acrylate, hydroxy ethyl acrylate, acrylic acid a weight ratio of about 15/14.8/38/32/0.2 and has a number average molecular weight of about 1,500 determined by gel permeation chromatography using polymethyl methacrylate as a standard, an acid number of 2.0–5.0 and a hydroxyl content of 5.4% and a glass transition temperature of −8° C. and contains 4.6% by weight of mercapto ethanol chain transfer agent.

A medium molecular weight acrylic polymer solution is prepared by charging the following constituents into a polymerization vessel equipped as above:

|  | Parts by Weight |
|---|---|
| Portion 1 | |
| Styrene monomer | 16.69 |
| Methyl methacrylate monomer | 34.13 |
| n-Butyl acrylate monomer | 180.84 |
| Hydroxy ethyl acrylate monomer | 52.36 |
| Acrylic acid monomer | 0.70 |
| Methyl ethyl ketone | 210.88 |
| 2-Mercapto ethanol | 2.04 |
| Portion 2 | |
| Methyl ethyl ketone | 108.78 |
| Azobisisobutyronitrile | 11.22 |
| Portion 3 | |
| Methyl ethyl ketone | 5.00 |
| Portion 4 | |
| Styrene monomer | 88.16 |
| Methyl methacrylate monomer | 63.09 |
| n-Butyl acrylate monomer | 100.94 |
| Hydroxy ethyl acrylate monomer | 105.14 |
| Acrylic acid monomer | 0.56 |
| Portion 5 | |
| Methyl ethyl ketone | 9.19 |
| 2-Mercapto ethanol | 2.31 |
| Portion 6 | |
| Methyl methacrylate monomer | 6.31 |
| 2-Hydroxy ethyl acrylate monomer | 6.31 |
| Portion 7 | |
| Methyl ethyl ketone | 5.00 |
| 2-Mercapto ethanol | 0.35 |
| Total | 1010.00 |

Portion 1 is charged into the polymerization vessel and heated to its reflux temperature. The constituents are under constant agitation in the polymerization vessel during the entire process. Portion 2 is premixed and added at a rate of about 1.0 parts/minute over a 120 minute period while the resulting reaction mixture is held at its reflux temperature. Portion 3 is added to the vessel. Portion 4 is premixed and added simultaneously with Portion 2 at a rate of about 3.72 parts/minute for 65 minutes and then at a rate of 1.45 parts/minute for the next 80 minutes. Portion 5 is premixed and added simultaneously with Portions 2 and 4 at the rate of about 0.125 parts/minute for 65 minutes and then at a rate of about 0.05 parts/minute for 80 minutes. After all of Portion 5 is added, the reaction mixture is held at its reflux temperature for an additional 25 minutes. Portion 6 is added and held at reflex for about 170 minutes and then Portion 7 is added and held at reflux for about 80 minutes and about 145 parts of methyl ethyl ketone are stripped off and the solution is cooled to 50° C. and then filtered.

The polymer solution has a polymer solids content of about 75% and the polymer is of styrene, methyl methacrylate, n-butyl acrylate, hydroxy ethyl acrylate, acrylic acid in a weight ratio of about 16/15.8/43/25/0.2 and has a number average molecular weight of about 5,000 determined as above, an acid number of 2.0–5.0 and a hydroxyl content of 3.8% and a glass transition temperature of −10° C. and contains 0.7% by weight of mercapto ethanol chain transfer agent.

A coating composition is prepared by blending the following constituents:

|  | Parts by Weight |
|---|---|
| Low molecular weight acrylic polymer solution (prepared above) | 35 |
| Medium molecular weight acrylic polymer solution (prepared above) | 30 |
| Melamine resin (methoxy/butoxy methyl melamine) | 35 |
| Acid catalyst solution (20% solids solution in methanol of paratoluene sulfonic acid blocked with dimethyl oxazolidine) | 0.3 |

The above composition is sprayed onto a steel panel primed with an alkyd resin primer and baked for 30 minutes at 120° C. to give a gloss hard film having a good appearance.

EXAMPLE 2

A low molecular acrylic polymer solution is prepared by charging the following constituents into a polymerization vessel equipped as in Example 1:

|  | Parts by Weight |
|---|---|
| Portion 1 | |
| Ethylene glycol monoethyl ether acetate | 1600.0 |
| Portion 2 | |
| Styrene Monomer | 365.0 |
| Methyl methacrylate monomer | 360.0 |
| n-Butyl acrylate monomer | 980.0 |
| Hydroxy ethyl acrylate monomer | 570.0 |
| Acrylic acid monomer | 5.0 |
| Tert. butyl per acetate solution (75% solution in mineral spirits) | 78.5 |
| Total | 3958.5 |

Portion 1 is charged into a polymerization vessel and heated to its reflux temperature. Portion 2 is premixed and added at a uniform rate over a 240 minute period while the resulting reaction mixture is held at its reflux temperature. After all of Portion 2 is added, the resulting reaction mixture is at its reflux temperature for an additional 45 minutes while about 825 parts of solvent are stripped off of the reaction mixture. The resulting polymer solution is cooled to 50° C. and filtered.

The polymer solution has a polymer solids content of about 73% and the polymer is of styrene, methyl methacrylate, n-butyl acrylate, hydroxy ethyl acrylate, acrylic acid in a weight ratio of about 16/15.8/43/25/0.2 and the polymer has a number average molecular weight of about 3,000, determined as in Example 1, an acid number of about 2.0–5.0, a hydroxyl content of about 3.8% and a glass transition temperature of about −10° C.

A medium molecular weight acrylic polymer solution is prepared by charging the following constituents into an polymerization vessel equipped as in Example 1.

|  | Parts by Weight |
|---|---|
| Portion 1 | |
| Ethylene glycol monoethyl ether acetate | 1330 |
| n-Butyl alcohol | 230 |
| Aliphatic hydrocarbon solvent | 966 |

-continued

| | Parts by Weight |
|---|---|
| Portion 2 | |
| Styrene monomer | 1624 |
| Methyl methacrylate monomer | 1176 |
| n-Butyl acrylate monomer | 1792 |
| Hydroxy ethyl acrylate monomer | 952 |
| Acrylic acid monomer | 56 |
| Portion 3 | |
| Ethylene glycol monoethyl ether acetate | 210 |
| Aliphatic hydrocarbon solvent | 210 |
| Di-tertiary-butyl peroxide | 118 |
| Total | 8664 |

Portion 1 is charged into a polymerization vessel and heated under a nitrogen atmosphere to its reflux temperature. Portion 2 is premixed and added to the polymerization vessel at a uniform rate over a 240 minute period while the resulting reaction mixture is held at its reflux temperature. Portion 3 is premixed and added simultaneously with Portion 2 to the polymerization vessel over a 150 minute period. After all of Portion 2 is added the reaction mixture is held at its reflux temperature for about 60 minutes while solvent is stripped off of the mixture. The resulting polymer solution is cooled to 50° C. and filtered. After 787 parts by weight of butyl acetate are added to form a clear solution.

The polymer solution has a polymer solids content of about 60% and the polymer is of styrene, methyl methacrylate, n-butyl acrylate, hydroxy ethyl acrylate, acrylic acid in a weight ratio of about 29/21/32/17/1 and the polymer has a number average molecular weight of about 7,000 determined as in Example 1, an acid number of about 8, a hydroxyl content of about 2.5% and a glass transition temperature of about 14° C.

A coating composition is prepared by blending the following constituents:

| | Parts by Weight |
|---|---|
| Low molecular weight acrylic polymer solution (prepared above) | 35 |
| Medium molecular weight acrylic polymer solution (prepared above) | 30 |
| Melamine resin (methoxy/butoxy methyl melamine) | 35 |
| Acid catalyst solution (20% solids solution in methanol of paratoluene sulfonic acid blocked with dimethyl oxazolidine) | 0.3 |

The above composition is sprayed onto a steel panel primed with an alkyd resin primer and baked for 30 minutes at 120° C. to give a glossy hard film having a good appearance.

EXAMPLE 3

The following compositions are prepared and then blended together to form a high solids light blue enamel:

| Silica Mill Base | Parts by Weight |
|---|---|
| Low molecular weight acrylic polymer solution (prepared in Example 2) | 389.65 |
| Xylene | 200.92 |
| Ethylene glycol monoethyl ether acetate | 200.84 |
| Fine divided silica (treated with dimethyl dichloro silane) | 56.59 |
| Total | 848.00 |

The above constituents are charged into a conventional sand mill and ground to form a mill base.

| Iron Pyrophosphate Mill Base | Parts by Weight |
|---|---|
| Low molecular weight acrylic polymer solution (prepared in Example 2) | 494.24 |
| Xylene | 233.28 |
| Iron pyrophosphate pigment | 207.48 |
| Total | 935.00 |

The above constituents are charged into a conventional sand mill and ground to form a mill base.

| Indo Blue Mill Base | Parts by Weight |
|---|---|
| Acrylic polymer solution (60% solids in a solvent mixture of petroleum naphtha, ethylene glycol monoethyl ether acetate, butanol of a polymer of styrene/butyl acrylate/hydroxyethyl acrylate/acrylic acid, weight ratio of 50/38/8/4) | 50.00 |
| Butyl acetate | 43.00 |
| Indanthrone Blue Toner | 7.00 |
| Total | 100.00 |

The above constituents are mixed together and then ground in a conventional sand mill to form a mill base.

| Blue Mill Base | Parts by Weight |
|---|---|
| Portion 1 | |
| Acrylic polymer solution (described above) | 14.30 |
| Butyl acetate | 57.70 |
| Portion 2 | |
| "Monastral" Blue pigment | 8.00 |
| Portion 3 | |
| Acrylic polymer solution (described above) | 20.00 |
| Total | 100.00 |

Portion 1 is charged into a mixing vessel and mixed for 15 minutes, Portion 2 is added and mixed for 1 hour and Portion 3 is added and mixed for 1 hour. The resulting composition is ground in a conventional sand mill to form a mill base.

| Aluminum Flake Mill Base | Parts by Weight |
|---|---|
| Low molecular weight acrylic polymer solution (prepared in Example 2) | 509.41 |
| Xylene | 198.91 |

-continued

| Aluminum Flake Mill Base | Parts by Weight |
|---|---|
| Aluminum paste (65% aluminum flake in mineral spirits) | 188.68 |
| Total | 897.00 |

The above constituents are thoroughly mixed together to form a mill base.

| Para Toluene Sulfonic Acid Solution | Parts by Weight |
|---|---|
| Para toluene sulfonic acid | 131.54 |
| Methanol | 515.08 |
| Dimethyl oxazolidine | 92.38 |
| Total | 739.00 |

The above constituents are thoroughly blended together to form an acid solution.

A light blue paint is prepared by thoroughly blending together the following constituents:

| | Parts by Weight |
|---|---|
| Silica mill base (prepared above) | 196.00 |
| Iron pyrophosphate mill base (prepared above) | 29.45 |
| Medium molecular weight acrylic polymer solution (prepared in Example 2) | 210.22 |
| 2(2'-hydroxyphenyl) benzotriazole | 8.67 |
| Nickel bis[O-ethyl(3,5 di-tertiary-butyl-4-hydroxy benzyl) phosphonate] | 4.34 |
| Tetrakis methylene 3(3',5'-dibutyl-4'-hydroxyphenyl) propionate methane | 0.41 |
| Methanol | 30.27 |
| Blue mill base (prepared above) | 5.07 |
| Indo Blue mill base (prepared above) | 19.39 |
| Aluminum flake mill base (prepared above) | 66.67 |
| Melamine resin (methoxy/butoxy methyl melamine) | 174.24 |
| Methyl amyl ketone | 25.03 |
| Methyl isobutyl ketone | 24.46 |
| Diisobutyl ketone | 24.70 |
| Paratoluene sulfonic acid solution (prepared above) | 7.36 |
| Amine solution (25% dimethyl oxazolidine in methanol) | 14.72 |
| Total | 841.00 |

The above composition is sprayed onto a steel panel primed with an alkyd resin primer and baked for 30 minutes at about 120° C. to give a glossy, hard finish with a good appearance. The finish is resistant to weathering, solvents, scratches and has excellent chip resistance. The above properties show that the coating composition is useful for finishing cars and trucks.

We claim:

1. A high solids coating composition comprising at least 50% by weight of a binder of film-forming constituents and up to 50% by weight of a nonaqueous liquid carrier; in which the film-forming constituents consist essentially of (A) about 5-45% by weight of a medium molecular weight acrylic polymer having a number average molecular weight, determined by gel permeation chromotography, of about 5,000-20,000, a hydroxyl content of about 2-10% by weight, a glass transition temperature of about −20° C. to +25° C., (B) about 10-50% by weight of a low molecular weight acrylic polymer having a number average molecular weight determined as above of about 500-7,500, a hydroxyl content of about 2-10% by weight, a glass transition temperature of about −20° C. to +25° C.; and wherein the acrylic polymers being the same or different consist essentially of 15-82% by weight of methyl methacrylate, 2-50% by weight of an alkyl methacrylate or an alkyl acrylate each having 2-18 carbon atoms in the alkyl group, and 16-35% by weight of a hydroxy alkyl acrylate or a hydroxy alkyl methacrylate, each having 2-4 carbon atoms in the alkyl group and wherein the difference in molecular weight between the acrylic polymers is at least 3000; and (C) about 25-45% by weight of an alkylated melamine formaldehyde cross-linking agent having 1-4 carbon atoms in the alkyl group; and in addition to the film-forming constituents contains about 0.1-2.0% by weight of an acid catalyst.

2. The coating composition of claim 1 containing pigment in addition to the binder in the amount of about 0.1-30% by weight, based on the weight of the coating composition.

3. The coating composition of claim 1 in which the acrylic polymers contain about 0.1-30% by weight of styrene.

4. The coating composition of claim 1 in which the acrylic polymers consists essentially of methyl methacrylate, an alkyl acrylate having 2-12 carbon atoms in the alkyl group, and a hydroxy alkyl acrylate or a hydroxy alkyl methacrylate, each having 2-4 carbon atoms in the alkyl group.

wherein the medium molecular weight acrylic polymer has a number average molecular weight of about 5,000-10,000 and the low molecular weight acrylic polymer has a number average molecular weight of about 1,500-4,000.

5. The coating composition of claim 3 in which each of the acrylic polymers consists essentially of
10-20% by weight of styrene,
10-20% by weight of methyl methyacrylate,
35-48% by weight of butyl acrylate,
20-30% by weight of hydroxyl ethyl acrylate and
0.1-5% by weight of acrylic acid, wherein the medium molecular weight acrylic polymer has a number average molecular weight of about 5,000-10,000 and the low molecular weight acrylic polymer has a number average molecular weight of about 1,500-4,000.

6. The coating composition of claim 4 or 5 in which the cross-linking agent is hexamethoxybutoxy methyl melamine.

7. The coating composition of claim 6 in which the catalyst is an alkyl acid phosphate, phosphoric acid, paratoluene sulfonic acid or an adduct of either of said acids.

8. The coating composition of claim 7 in which the catalyst is an adduct of paratoluene sulfonic acid and an alkyl oxazolidine.

9. The coating composition of claim 4 containing about 0.5-15% by weight, based on the weight of the coating composition, of a polyhydroxy functional compound which is a solvent for the film-forming constituents and will crosslink with the film-forming constituents on heating of the coating composition.

10. The coating composition of claim 9 in which the polyhydroxy functional compound is selected from the group consisting of trimethylol ethane, trimethylol propane, trimethylol butane, trimethyl pentanediol, pentaerythriotol, pentanediol, diethylene glycol, dipropylene glycol, triethylene glycol, 2-ethyl-1,3-hexane diol, tripropylene glycol, butanediol and low molecular weight hydroxyl terminated polyesters.

11. The coating composition of claims 1 or 2 containing about 0.1–20% by weight, based on the weight of the binder, of an ultraviolet light stabilizer.

12. The coating composition of claim 11 containing about 0.1–5% by weight, based on the weight of the binder, of an antioxidant.

13. The coating composition of claim 12 containing about 0.1–10% by weight, based on the weight of the binder, of iron pyrophosphate.

* * * * *